R. H. BOWEN.
SHOCK ABSORBER.
APPLICATION FILED AUG. 16, 1912.
1,101,993.
Patented June 30, 1914.
2 SHEETS—SHEET 1.
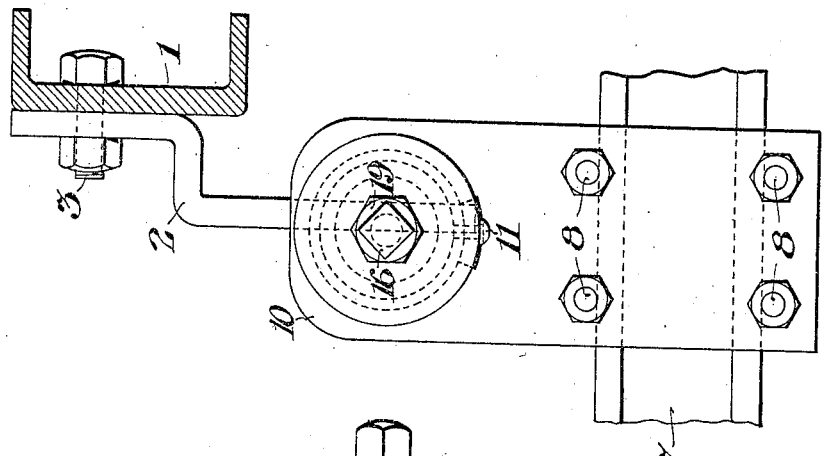
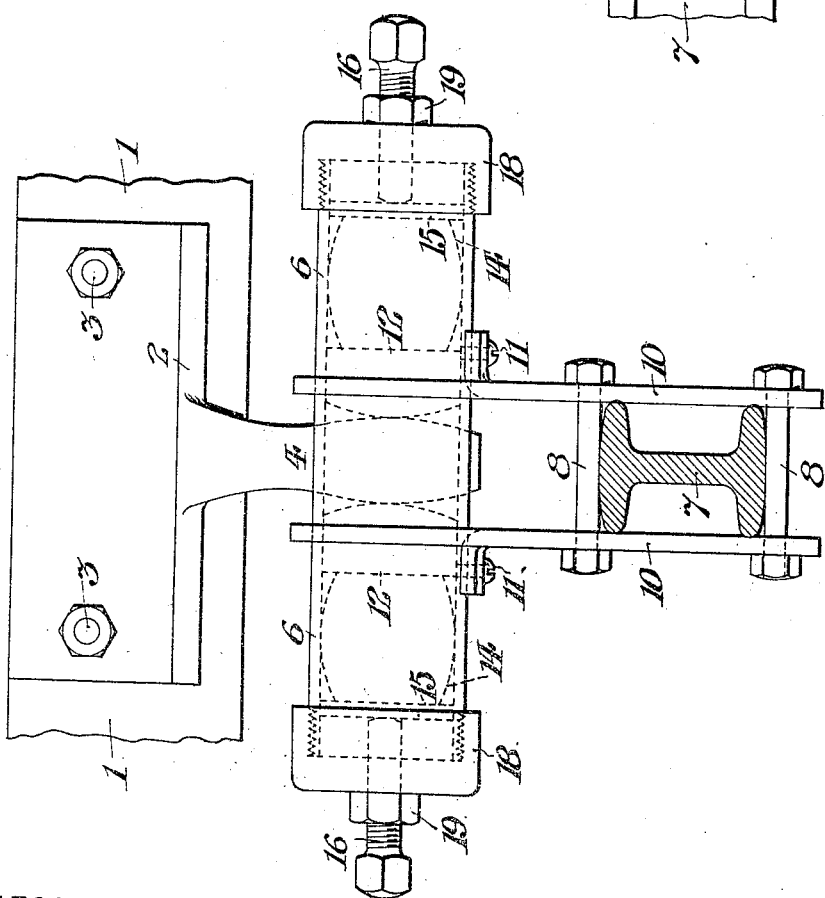
WITNESSES:
Philip W. Vessey.
James McCabe
INVENTOR:
Russell Heppard Bowen,
by Arthur E. Paige,
Attorney.

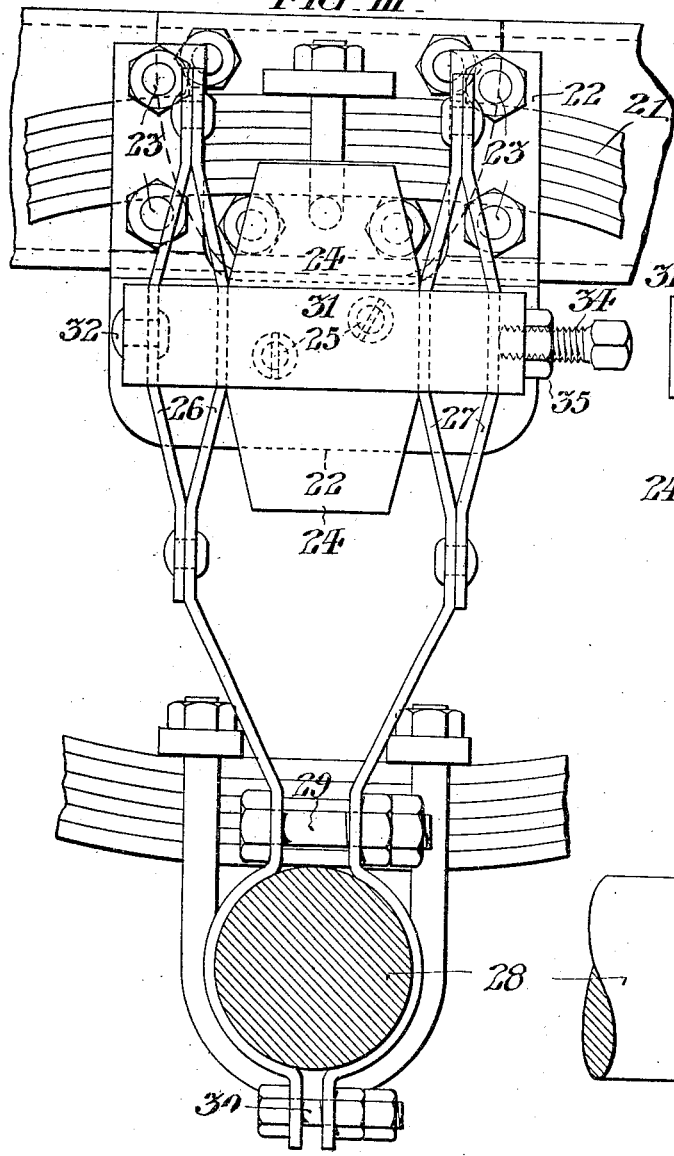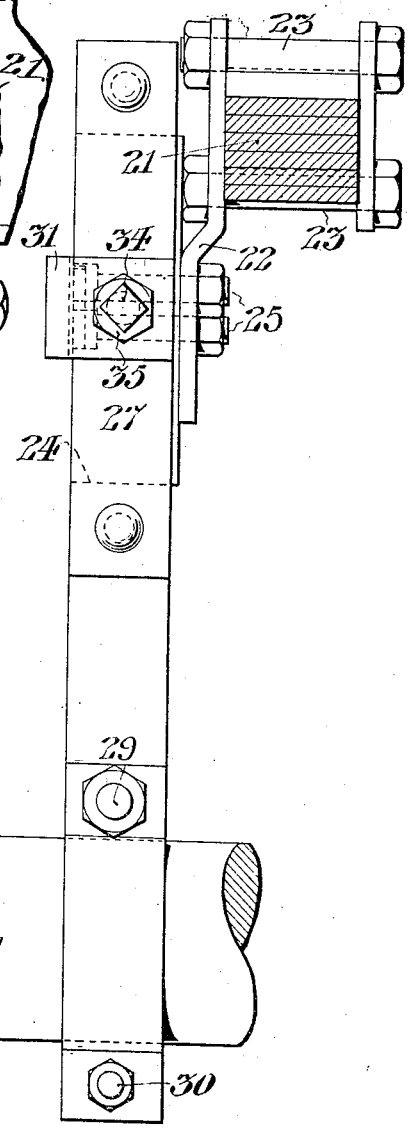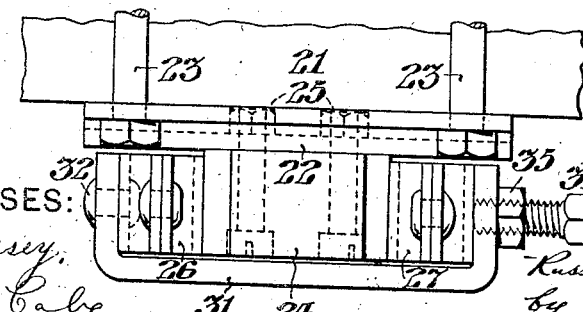

UNITED STATES PATENT OFFICE.

RUSSELL HEPPARD BOWEN, OF PHILADELPHIA, PENNSYLVANIA.

SHOCK-ABSORBER.

1,101,993.  Specification of Letters Patent.  Patented June 30, 1914.

Application filed August 16, 1912. Serial No. 715,319.

*To all whom it may concern:*

Be it known that I, RUSSELL HEPPARD BOWEN, of Philadelphia, in the State of Pennsylvania, have invented a certain new and useful Improvement in Shock-Absorbers, whereof the following is a specification, reference being had to the accompanying drawings.

My invention relates to means, including a wedge and means arranged to variably frictionally engage said wedge, interposed between two relatively movable, spring connected, bodies; whereby, shocks upon said bodies tending to relatively move them are absorbed or minimized in transmission from one body to another by said interposed means checking the relative movements of said bodies. Such means may be advantageously employed for checking the movements of vehicle bodies relatively to their supporting wheels, and, as hereinafter described, my invention includes the combination with a double wedge rigidly connected with the body or frame of a vehicle; of a friction clamp, connected with the vehicle supporting wheel axle, including resilient members upon opposite sides of said wedge and a set screw, whereby the pressure of said resilient members upon said wedge may be varied. The arrangement is such that said clamp normally engages the widest portion of said wedge, which is intermediate of its length; so that friction upon said wedge increases as it approaches its normal position from either direction, thus tending to arrest it in its normal position.

My invention includes the various novel features of construction and arrangement hereinafter more definitely specified.

In the drawings:—Figure I is a side view of a convenient embodiment of my invention. Fig. II is an elevation of the right hand end of the mechanism shown in Fig. I. Fig. III is a side view of a modified form of my invention. Fig. IV is an elevation of the right hand end of the mechanism shown in Fig. III. Fig. V is a plan view of said mechanism shown in Figs. III and IV.

Referring to the form of my invention shown in Figs. I and II the body or frame 1 of the vehicle is provided with the member 2 conveniently rigidly connected therewith by the bolts 3 and carrying the double wedge 4. Said wedge is fitted to reciprocate transversely through the tubular casing 6 carried by the vehicle supporting wheel axle 7 and conveniently rigidly connected therewith by the bolts 8 which extend through the brackets 10 depending from said tube 6 and rigidly connected with the latter by the screws 11. Said casing 6 holds wooden blocks 12 upon opposite sides of said wedge 4 which are backed by rubber buffers 14 having at their outer ends metal disks 15 upon which bear the set screws 16 by which said buffers 14 may be variably compressed to vary the friction of said blocks 12 upon said wedge 4; said screws 16 being threaded through the caps 18 on said casing 6 and locked in adjusted position by the nuts 19. It is to be understood that springs are interposed between said body frame 1 and axle 7 and that said set screws 16 are so adjusted that under normal conditions the wedge 4 is frictionally engaged at its widest portion between said blocks 12.

It may be observed that if a depression in the road bed be presented beneath the axle 7, said axle is depressed by the springs between it and the vehicle frame 1 as the wheel or wheels on said axle sink into said depression, so that the blocks 12 slip down upon the lower converging portion of the wedge 4, and, as said wheels rise from said depression in the road bed said blocks 12 are thrust upwardly with respect to said wedge 4, with gradually increasing friction thereon, until the widest portion of the wedge is in axial alinement between said blocks 12 as shown in Fig. I. If the relative movement of said axle and frame 1 is sufficient to raise the blocks 12 beyond the widest portion of the wedge 4, compressing the springs beyond their normal degree, then said blocks 12 bear upon the upwardly converging portions of the wedge 4, and, upon reflex movement of said springs, said blocks 12 are thrust downwardly with gradually increasing friction upon the wedge 4 until the widest portion of the latter is presented in axial alinement with said blocks 12 as shown in Fig. I. If an elevation in the road bed be presented beneath the axle 7 the latter is elevated with respect to the frame 1, compressing the springs between them, and the blocks 12 bear upon the upwardly converging portion of the wedge 4 until the reflex movement of the springs returns said blocks until the widest portion of the wedge is in axial alinement therewith as shown in Fig. I. If the relative movement is sufficient to present the lower converging portion of the wedge 4 between said blocks 12 the springs tend to restore the parts to the normal position shown in Fig. I, with gradually increasing friction upon the wedge as they approach that position; so that the friction upon said wedge tends to prevent and minimize relative vertical movements of the vehicle body with respect to its supporting wheels.

Referring to the form of my invention shown in Figs. III to V inclusive; the springs 21, which are attached to the body or frame of the vehicle, are provided with the member 22 conveniently rigidly connected therewith by the bolts 23 and carrying the double wedge 24 which is conveniently rigidly connected therewith by the bolts 25; said wedge 24 being preferably formed of wood. Said wedge 24 is fitted to reciprocate in the yoke 31 between the springs 26 and 27 carried by the vehicle supporting wheel axle 28 and conveniently connected therewith by the bolts 29 and 30. Said yoke 31 is rigidly connected with the outer leaf of said spring 26, conveniently by the rivet 32, and, said yoke is provided with the set screw 34 which bears upon the outer leaf of the spring 27, whereby said springs 26 and 27 may be variably compressed to vary their frictional engagement upon said wedge 24; said screw 34 being threaded through said yoke 31 and locked in adjusted position by the nut 35. It is to be understood that said springs 21 are interposed between the vehicle body and said axle 28 and that the set screw 34 is so adjusted that under normal conditions the wedge 24 is frictionally engaged at its widest portion between said springs 26 and 27. Otherwise, the operation of the form of my invention shown in Figs. III to V inclusive is such as above described with reference to the form of my invention shown in Figs. I and II.

It may be observed that it is characteristic of both forms of my invention above described that means are interposed between two relatively movable, spring connected, bodies, including a wedge and means for frictionally engaging said wedge; whereby, shocks upon said bodies tending to relatively move them are absorbed or minimized in transmission from one body to the other by said interposed means controlling the relative movements of said bodies. Therefore, I do not desire to limit myself to the specific details of construction or arrangement of such means herein set forth as it is obvious that various modifications may be made therein without departing from the essential features of my invention as defined in the appended claims.

I claim:—

1. The combination with a double wedge, of wood, having its widest portion intermediate of its length; of means pariably frictionally engaging said wedge, including resilient members upon opposite sides thereof; a yoke embracing said resilient members and wedge; a set screw extending through said yoke in threaded engagement therewith; a nut engaging said screw; means rigidly connecting said wedge with a vehicle body; and, means connecting said yoke with a vehicle axle.

2. The combination with a double wedge having its widest portion intermediate of its length; of means variably frictionally engaging said wedge, including resilient members upon opposite sides thereof; a yoke; a set screw carried by said yoke; a nut engaging said screw; means rigidly connecting said wedge with a vehicle body; and, means connecting said yoke with a vehicle axle.

3. The combination with a double wedge having its widest portion intermediate of its length; of means variably frictionally engaging said wedge, including resilient members upon opposite sides thereof; a yoke; a set screw carried by said yoke in threaded engagement therewith; a nut engaging said screw.

4. The combination with a double wedge having its widest portion intermediate of its length; of means variably frictionally engaging said wedge, including resilient members upon opposite sides thereof; and means whereby the pressure of said resilient members upon said wedge may be adjustably varied.

In testimony whereof, I have hereunto signed my name at Philadelphia, Pennsylvania, this fourteenth day of August, 1912.

RUSSELL HEPPARD BOWEN.

Witnesses:
GERTRUDE N. R. MATTSON,
ETHEL M. IMSCHWEILER.

Correction in Letters Patent No. 1,101,993.

It is hereby certified that in Letters Patent No. 1,101,993, granted June 30, 1914, upon the application of Russell Heppard Bowen, of Philadelphia, Pennsylvania, for an improvement in "Shock-Absorbers," an error appears in the printed specification requiring correction as follows: Page 2, line 66, for the word "pariably" read *variably;* and that the said Letters Patent should be read with this correction therein that the same may conform to the record of the case in the Patent Office.

Signed and sealed this 14th day of July, A. D., 1914.

[SEAL.]

J. T. NEWTON,
*Acting Commissioner of Patents.*